United States Patent Office 2,909,524
Patented Oct. 20, 1959

2,909,524

SUBSTITUTED ACETYLPIPERAZINES

Harry P. Dalalian, Rutherford, N.J., and Lee N. Starker, Pearl River, and Leon Goldman, Nanuet, N.Y., assignors to American Cyanamid Company, New York, N.Y., a corporation of Maine No Drawing. Application April 7, 1958
Serial No. 726,656

13 Claims. (Cl. 260—268)

This invention relates to new organic compounds. More particularly, it relates to substituted trihaloacetylpiperazines.

In grazing animals, such as sheep, stomach worms often develop. These are usually *Haemonchus contortus, Ostertagia circumcincta* or *Trichostrongylus axei*. In the eastern and southern states *Haemonchus* infection is probably the most common type of stomach worm infection. The principal lesions of haemonchosis are those associated with anemia, and in severe acute cases the animal may die before eggs are passed in the feces. In the treatment of haemonchosis, phenothiazine is the most commonly used anthelmintic.

We have now found that substituted trihaloacetylpiperazines are highly active in the treatment of haemonchosis in animals. These compounds can be illustrated by the following general formula:

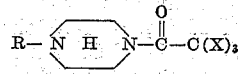

in which R is a lower alkyl, cycloalkyl, phenyl, lower alkylphenyl, dilower alkylphenyl, halophenyl, carbobenzyloxy, carbolower alkoxy radical, aryl-lower alkylene or a heterocyclic group containing at least one nitrogen atom and carbon atoms, the bond from the piperazine ring to the heterocyclic substituent being to a

group, X is halogen and acid addition salts thereof.

The free compounds are generally crystalline solids, although some are liquids at room temperature. The salts of the compounds are crystalline solids and are soluble in water. The bases, in general, are soluble in the usual organic solvents and relatively insoluble in water.

The compounds of the present invention are prepared by reacting an N-substituted piperazine with a trihaloacetyl chloride or anhydride. The reaction can be carried out within the range of −5° C. to 100° C.; however, the preferred range is 15° to 85° C. The reaction is preferably carried out in a solvent; however, the choice of solvent depends on the acylating agent. The solvents can be ether, petroleum ether, acetone, benzene, ethyl acetate, dimethylformamide and the like.

The following Table 1 shows the level of activity of the present compounds in Haemonchus infection in sheep.

TABLE I

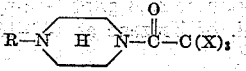

Activity against Haemonchus in sheep

| R | X | Active At Single Oral Dose, mg./kg. |
|---|---|---|
| Phenyl | Fluorine | 7.5 |
| Do | Chlorine | 37.5 |
| 2,6-Xylyl | Fluorine | 50 |
| m-Chlorophenyl | do | 7.5 |
| p-Chlorophenyl | do | 7.5 |
| 2-Thiazolyl | do | 100 |
| 2-Pyrimidinyl | do | 50 |
| 2-Pyridyl | do | 8.5 |
| Ethyl | do | 7.5 |
| Carbethoxy | do | 100 |
| Carbisobutoxy | do | 100 |

The level of activity of the present compounds varied from 7.5 to 100 mg./kg. of body weight.

The following Table II shows that representative dihaloacetyl piperazines corresponding to the present compounds are inactive in Haemonchus infection in sheep.

TABLE II

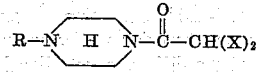

Activity against Haemonchus in sheep

| R | X | Single Oral Dose, mg./kg. |
|---|---|---|
| Phenyl | Chlorine | Inactive 200. |
| 2-Pyridyl | do | Inactive 100. |
| Methyl | do | Inactive 200. |

The compounds of the present invention can be used in the form of tablets, capsules, pills or other pharmaceutical types of medication by combining them with suitable carriers. The compositions can also be combined with animal feed and a definite portion of this feed given at regular intervals for a short period of time.

The following examples illustrate in detail the preparation of substituted trihaloacetylpiperazines.

EXAMPLE 1.—1-PHENYL-4-TRIFLUOROACETYLPIPERAZINE

A solution of 52.0 g. of trifluoroacetic anhydride in 50 ml. of benzene and 50 ml. of ether was slowly added to a stirred solution of 81.0 g. of 1-phenylpiperazine in 250 ml. of benzene at 10–15° C. The mixture was then stirred for one hour at room temperature after which 67.5 g. of colorless crystals of 1-phenylpiperazine trifluoroacetate were removed by filtration. The filtrate was freed from solvents under reduced pressure and the residual oil was crystallized from ethanol to yield 34.0 g. of 1-phenyl-4-trifluoroacetylpiperazine as colorless crystals, melting point 66°–68° C.

EXAMPLE 2.—1-METHYL-4-TRIFLUOROACETYLPIPERAZINE HYDROCHLORIDE

A solution of 25.0 g. of trifluoroacetic anhydride in 50 ml. of benzene and 50 ml. of ether was added slowly to a stirred solution of 24.0 g. of 1-methylpiperazine in 100 ml. of benzene at 10°–25° C. The mixture was then stirred at room temperature for one hour, after which 22.9 g. of colorless crystals of 1-methylpiperazine trifluoroacetate were removed by filtration. The filtrate was concentrated at reduced pressure, and the residual mobile liquid was distilled to yield 15.0 g. of 1-methyl-4-trifluoroacetylpiperazine as a colorless liquid, boiling point 82°–84° C. per 11 mm., $n_D^{25}$ 1.4259.

A solution of 6.7 g. of 1-methyl-4-trifluoroacetylpiperazine in ethyl acetate was treated with anhydrous hydrogen chloride. The resulting solution was diluted with ether and filtered to yield 6.6 g. of 1-methyl-4-trifluoroacetylpiperazine hydrochloride as colorless crystals, melting point 163–170° C. Recrystallization from n-butanol gave colorless crystals, melting point 170–171° C.

EXAMPLE 3.—1-(P-TOLYL)-4-TRIFLUOROACETYL-PIPERAZINE

A stirred solution of 20.0 g. of 1-(p-tolyl)-piperazine in 100 g. of trifluoroacetic acid was treated with dropwise addition of 25.0 g. of trifluoroacetic anhydride during the course of ten minutes at room temperature. The resulting solution was gently refluxed for two hours, allowed to stand overnight at room temperature, and then evaporated to residue under reduced pressure. A solution of the residue in benzene was washed with water, and the benzene was then removed under reduced pressure. The brown crystalline residue was recrystallized from aqueous ethanol to yield 24.5 g. of 1-(p-tolyl)-4-trifluoroacetylpiperazine as brownish-yellow crystals, melting point 65°–67° C. Recrystallization from absolute ethanol gave colorless crystals, melting point 70°–71° C.

EXAMPLE 4.—1-(2,6-XYLYL)-4-TRIFLUOROACETYL-PIPERAZINE

A solution of 23.1 g. of trifluoroacetic anhydride in 25 ml. of benzene and 25 ml. of ether was slowly added to a stirred solution of 1-(2,6-xylyl)-piperazine in 100 ml. of benzene 10°–20° C. The clear solution was stirred at room temperature for one hour and then refluxed for eight hours. On chilling, crystallization took place, and 13.9 g. of colorless crystals of 1-(2,6-xylyl)piperazine trifluoroacetate were removed by filtration. The filtrate was concentrated under reduced pressure, and the residue was slurried with ether and filtered to yield an additional 9.5 g. of 1-(2,6-xylyl)piperazine trifluoroacetate. The filtrate was evaporated to dryness under reduced pressure leaving 28.1 g. of 1-(2,6-xylyl)-4-trifluoroacetylpiperazine as a crystalline solid, melting point 74°–77° C. Recrystallization from n-butanol gave colorless needles, melting point 77°–78° C.

EXAMPLE 5.—1-(M-CHLOROPHENYL)-4-TRIFLUORO-ACETYLPIPERAZINE HYDROCHLORIDE

A solution of 23.1 g. of trifluoroacetic anhydride, 25 ml. of benzene and 25 ml. of ether was slowly added to a stirred solution of 39.6 g. of 1-(m-chlorophenyl)-piperazine in 100 ml. of benzene at 10°–20° C. After being allowed to stand overnight at room temperature, the suspension was diluted with ether and filtered to yield in two crops 28.6 g. of 1-(m-chlorophenyl)piperazinetrifluoroacetate as nearly colorless crystals, melting point 105°–108° C. Dilution of the filtrate with light petroleum ether precipitated 21.7 g. of 1-(m-chlorophenyl)-4-trifluoroacetylpiperazine which, after recrystallization from ethanol, gave colorless crystals, melting point 53°–54° C.

A solution of 10.0 g. of the product in 25 ml. of warm methanol was treated with 15.0 ml. of 2.4 N methanolic hydrogen chloride and filtered to yield 8.0 g. of 1-(m-chlorophenyl)-4-trifluoroacetylpiperazine hydrochloride as colorless crystals, melting point 171°–188° C. Recrystallization from methanol gave colorless crystals, melting point 177°–187° C.

EXAMPLE 6.—1-(P-CHLOROPHENYL)-4-TRIFLUORO-ACETYLPIPERAZINE

A stirred solution of 40.0 g. of 1-(p-chlorophenyl)-piperazine in 200 g. of trifluoroacetic acid was treated with 50.0 g. of trifluoroacetic anhydride over a twenty minute period at 15°–20° C. The mixture was heated to 70° C. and kept at that temperature for two hours. The resulting solution was evaporated under reduced pressure, and the residue was crystallized from absolute ethanol to yield 42.5 g. of 1-(p-chlorophenyl)-4-trifluoroacetylpiperazine as a colorless solid, melting point 103.5°–104.5° C.

EXAMPLE 7.—1-CARBOBENZYLOXY-4-TRIFLUORO-ACETYLPIPERAZINE

A solution of 41.0 g. of trifluoroacetic anhydride in 60 ml. of benzene and 60 ml. of ether was slowly added to a stirred solution of 90.0 g. of 1-carbobenzyloxypiperazine in 150 ml. of benzene at 20° C. After two and one-half hours, 66.0 g. of colorless crystals of 1-carbobenzyloxypiperazine trifluoroacetate was removed by filtration. The filtrate was concentrated under reduced pressure, and a solution of the residue in ether was washed with 6N hydrochloric acid, then with water, and dried over sodium sulfate. The filtered solution was stirred with activated charcoal, filtered and evaporated under reduced pressure to yield 35.0 g. of 1-carbobenzlyoxy-4-trifluoroacetylpiperazine as a colorless oil which eventually changed to colorless crystals, melting point 27.5°–28.5° C.

EXAMPLE 8.—1-CARBETHOXY-4-TRIFLUOROACETYL-PIPERAZINE

A solution of 46.2 g. of trifluoroacetic anhydride in 50 ml. of benzene and 50 ml. of ether was slowly added to a stirred solution of 63.3 g. of 1-carbethoxypiperazine in 200 ml. of benzene at 15°–20° C. The clear solution was allowed to stand at room temperature for six days and then evaporated under reduced pressure, leaving 111.6 g. of a viscous oil. Ether was added and partial solidification occurred. The solid was removed by filtration and washed with ether to yield 54.2 g. of colorless crystals of 1-carbethoxypiperazine trifluoroacetate. The filtrate was washed with three 50 ml. portions of water, dried over sodium sulfate, and evaporated under reduced pressure to yield 44.0 g. of 1-carbethoxy-4-trifluoroacetylpiperazine as a yellow oil.

EXAMPLE 9.—1-CYCLOHEXYL-4-TRIFLUOROACETYL-PIPERAZINE HYDROCHLORIDE

A solution of 23.1 g. of trifluoroacetic anhydride in 25 ml. of benzene and 25 ml. of ether was slowly added to a stirred solution of 33.6 g. of 1-cyclohexylpiperazine in 100 ml. of benzene at 15–20° C. After being allowed to stand at room temperature overnight, the mixture was filtered to yield 19.3 g. of pale yellow crystals of 1-cyclohexylpiperazine trifluoroacetate. The filtrate was washed with water, dried over sodium sulfate, and evaporated under reduced pressure to give 16.5 g. of 1-cyclohexyl-4-trifluoroacetylpiperazine as a residual mobile liquid.

The above liquid was dissolved in 100 ml. of ether and treated with 25 ml. of 2.4 N methanolic hydrogen chloride, to yield 16.0 g. of 1-cyclohexyl-4-trifluoroacetylpiperazine hydrochloride, as colorless crystals, melting point 233°–235° C. Recrystallization from n-butanol gave colorless crystals, melting point 235°–236° C.

EXAMPLE 10.—1-(2-THIAZOLYL)-4-TRIFLUOROACETYL-PIPERAZINE

A stirred solution of 200 g. of trifluoroacetic acid and 33.8 g. of 1-(2-thiazolyl)piperazine was treated with dropwise addition of 46.2 g. of trifluoroacetic anhydride during the course of ten minutes at room temperature. The solution was gently refluxed for two hours and then evaporated to residue under reduced pressure. Crystallization from ether-ethanol gave 26.0 g. of 1-(2-thiazolyl)-4-trifluoroacetylpiperazine trifluoroacetate as pale yellow crystals, melting point 97°–99° C. Treatment of 1-(2-thiazolyl)-4-trifluoroacetylpiperazine trifluoroacetate with an equivalent amount of sodium bicarbonate in water yielded 18.3 g. of 1-(2-thiazolyl)-4-trifluoroacetylpiperazine as colorless crystals, melting point 72°–74° C.

EXAMPLE 11.—1-(2-PYRIMIDINYL)-4-TRIFLUORO-ACETYLPIPERAZINE

A solution of 23.1 g. of trifluoroacetic anhydride in 25 ml. of benzene and 25 ml. of ether was slowly added to a stirred solution of 32.8 g. of 1-(2-pyrimidinyl)piperazine in 100 ml. of benzene at 14°–16° C. The mixture was then stirred for six hours at room temperature and allowed to stand at room temperature overnight. The precipitated solid was removed by filtration and washed with ether to give 27.5 g. of colorless crystals of 1-(2-pyrimidinyl)piperazine trifluoroacetate. The filtrate was evaporated under reduced pressure to give 22.9 g. of 1-(2-pyrimidinyl)-4-trifluoroacetylpiperazine as a residual yellow solid, melting point 75°–79° C. When recrystallized from absolute ethanol, 12.8 g. of colorless crystals, melting point 78°–80° C., were obtained.

EXAMPLE 12.—1-(2-PYRIDYL)-4-TRIFLUOROACETYL-PIPERAZINE HYDROCHLORIDE

A solution of 23.1 g. of trifluoroacetic anhydride in 25 ml. of benzene and 25 ml. of ether was slowly added to a stirred solution of 32.6 g. of 1-(2-pyridyl)piperazine in 100 ml. of benzene at 10°–15° C. After two days at room temperature, the mixture was filtered to give 27.6 g. of colorless crystals of 1-(2-pyridyl)piperazine trifluoroacetate. The filtrate was washed with water, dried over sodium sulfate, and evaporated under reduced pressure to yield 23.7 g. of 1-(2-pyridyl)-4-trifluoroacetylpiperazine as a tan liquid.

A solution of the above in 100 ml. of ether was treated with methanolic hydrogen chloride. On dilution with ether, an oil formed which then solidified. Filtration gave 22.0 g. of colorless crystals of 1-(2-pyridyl)-4-trifluoroacetylpiperazine hydrochloride, melting point 155°–156° C. Recrystallization from ethyl acetate and from ethanol gave colorless crystals, melting point 154°–156° C.

EXAMPLE 13.—1-CARBOMETHOXY-4-TRIFLUORO-ACETYLPIPERAZINE

A stirred solution of 45.0 g. of 1-carbomethoxypiperazine in 100 ml. of benzene was cooled to 5° C. and treated with dropwise addition of a solution of 36.0 g. of trifluoroacetic anhydride in 50 ml. of benzene and 50 ml. of ether during a thirty-minute period, the temperature being maintained below 20° C. After being allowed to stand overnight at room temperature, the mixture was evaporated under reduced pressure and the residue was slurried with ether to form two layers. The ether solution was washed with 1 N hydrochloric acid, 5% sodium bicarbonate and water, and dried over magnesium sulfate. The filtered solution was evaporated to give 29.6 g. of 1-carbomethoxy-4-trifluoroacetylpiperazine as a very pale yellow oil.

EXAMPLE 14.—1-CARBISOBUTOXY-4-TRIFLUORO-ACETYLPIPERAZINE

A stirred solution of 74.4 g. of 1-carbisobutoxypiperazine in 100 ml. of benzene was cooled to 5° C. and treated with dropwise addition of a solution of 46.2 g. of trifluoroacetic anhydride in 50 ml. of benzene and 50 ml. of ether during the course of thirty minutes. The mixture was allowed to stand overnight at room temperature and was evaporated under reduced pressure. Water was added to the residue and partial solidification resulted. The solid was removed by filtration, dissolved in ether, washed with 100 ml. of 1N hydrochloric acid and 100 ml. of water, and dried over magnesium sulfate. The filtered solution was evaporated under reduced pressure, and the crystalline residue was recrystallized from ethanol to yield 45.0 g. of 1-carbisobutoxy-4-trifluoroacetylpiperazine as colorless crystals, melting point 40°–41° C.

EXAMPLE 15.—1-BENZYL-4-TRIFLUOROACETYLPIPER-AZINE HYDROCHLORIDE

A stirred solution of 52.8 g. of 1-benzylpiperazine in 150 g. of trifluoroacetic acid was treated with the dropwise addition of 70.0 g. of trifluoroacetic anhydride during a thirty-minute period, the temperature gradually rising to 40° C. The mixture was gently refluxed for three hours and then evaporated to residue under reduced pressure. Addition of ether followed by filtration gave 103.2 g. of 1-benzyl-4-trifluoroacetylpiperazine trifluoroacetate as colorless crystals, melting point 136°–140° C. Treatment of this solid with an equivalent amount of aqueous sodium bicarbonate yielded an oil which was extracted from the bicarbonate solution with ether. The ether was removed under reduced pressure to give 48.6 g. of 1-benzyl-4-trifluoroacetylpiperazine as a pale yellow oil.

The oil was dissolved in ether and treated with hydrogen chloride. Filtration gave 50.9 g. of 1-benzyl-4-trifluoroacetylpiperazine hydrochloride as colorless crystals, melting point 232°–233° C.

EXAMPLE 16.—1-PHENYL-4-DICHLOROFLUOROACETYL-PIPERAZINE

To a stirred mixture of 32.4 g. of 1-phenylpiperazine in 100 g. of dichlorofluoroacetic acid was added dropwise 60.4 g. of dichlorofluoroacetic anhydride during a twenty-minute period while being heated to 80° C. The mixture was maintained at 80° C. for two hours and then evaporated to residue under reduced pressure. The solution of the residue in ether was washed with water, aqueous sodium bicarbonate, and water. The ethereal solution was dried over magnesium sulfate and concentrated under reduced pressure. The residual crystals were recrystallized from ethanol to yield 35.0 g. of 1-phenyl-4-dichlorofluoroacetylpiperazine as colorless crystals, melting point 63.5°–64° C.

EXAMPLE 17.—1-ETHYL-4-TRIFLUOROACETYLPIPER-AZINE HYDROCHLORIDE

To a stirred solution of 26.0 g. of 1-ethylpiperazine in 100 g. of trifluoroacetic acid was added dropwise 52.5 g. of trifluoroacetic anhydride during a forty-minute period, the temperature being maintained at 25°–30° C. The reaction mixture was refluxed gently for two hours and then concentrated under reduced pressure. Crystallization of the residual brown viscous liquid was accomplished by addition of ether. Filtration gave 46.0 g. of 1-ethyl-4-trifluoroacetylpiperazine trifluoroacetate as light brown crystals, melting point 119°–121° C.

The above was dissolved in water and 11.9 g. of sodium bicarbonate was carefully added. The resulting aqueous solution was extracted with three 100 ml. portions of ether. The combined ethereal extracts were dried over magnesium sulfate and the filtered solution was treated with hydrogen chloride. The resulting colorless solid was removed by filtration and recrystallized from n-butanol to yield 24.0 g. of 1-ethyl-4-trifluoroacetylpiperazine hydrochloride as colorless crystals, melting point 211.5–212.5° C.

EXAMPLE 18.—1-PROPYL-4-TRIFLUOROACETYLPIPER-AZINE HYDROCHLORIDE

A stirred solution of 33.0 g. of 1-propylpiperazine in 200 g. of trifluoroacetic acid was treated with dropwise addition of 65.0 g. of trifluoroacetic anhydride during a half-hour period, at 10–27° C. The resulting solution was refluxed gently for two and one-half hours and then allowed to stand overnight at room temperature. The yellow solution was concentrated under reduced pressure at 85° C. and the liquid residue was diluted with ether to yield, after filtration, 63.1 g. of 1-propyl-4-trifluoroacetylpiperazine trifluoroacetate as colorless crystals, melting point 111–113° C. The trifluoroacetate salt was dissolved in water and 15.7 g. of sodium bicarbonate was carefully added. The resulting aqueous solution was extracted with four 100 ml. portions of ether. The combined ether extracts were dried over sodium sulfate, and the filtered solution was treated with hydrogen chloride. A colorless crystalline solid was precipitated and removed by filtration, yielding 44.8 g. of 1-propyl-4-trifluoroacetylpiperazine hydrochloride, melting point 195.0–195.5° C. Recrystallization from butanol raised the melting point to 195.2–196.0° C.

EXAMPLE 19.—1-(P-NITROPHENYL)-4-TRIFLUORO-ACETYLPIPERAZINE

A solution of 41.4 g. of 1-(p-nitrophenyl)-piperazine in 200 g. of trifluoroacetic acid was treated with dropwise addition of 46.2 g. of trifluoroacetic anhydride over a fifteen minute period at 23–38° C. The resulting solution was refluxed gently for two hours and then concentrated under reduced pressure at 80° C. The liquid residue was diluted with ethanol to yield, after filtration, 51.6 g. of 1-(p-nitrophenyl)-4-trifluoroacetylpiperazine trifluoroacetate as yellow crystals, melting point 182–184° C. The trifluoroacetate salt was dissolved in water and neutralized with sodium bicarbonate. Filtration of the neutral mixture yielded 15.6 g. of 1-(p-nitrophenyl)-4-trifluoroacetylpiperazine as yellow crystals, melting point 85–95° C. Three crystallizations from absolute ethanol raised the melting point to 120.0–121.5° C.

We claim:

1. Compounds selected from the group having the formula:

$$R-N\diagup H \diagdown N-\overset{O}{\underset{\|}{C}}-C(X)_3$$

in which R is a member of the group consisting of lower alkyl, cycloalkyl, phenyl, lower alkylphenyl, dilower alkylphenyl, halophenyl, carbobenzyloxy, carboloweralkoxy, aryl-lower alkylene radicals and heterocyclic groups containing one nitrogen atom, not more than one other hetero atom, and not more than 5 carbon atoms, the bond from the piperazine ring to the heterocyclic substituent being to a

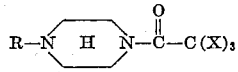

group, X is halogen and acid addition salts thereof.

2. 1-phenyl-4-trifluoroacetylpiperazine.
3. 1-(2,6-xylyl)-4-trifluoroacetylpiperazine.
4. 1-(m-chlorophenyl)-4-trifluoroacetylpiperazine hydrochloride.
5. 1-(p-chlorophenyl)-4-trifluoroacetylpiperazine.
6. 1-carbethoxy-4-trifluoroacetylpiperazine.
7. 1-(2-thiazolyl)-4-trifluoroacetylpiperazine.
8. 1-(2-pyrimidinyl)-4-trifluoroacetylpiperazine.
9. 1-(2-pyridyl)-4-trifluoroacetylpiperazine hydrochloride.
10. 1-carbisobutoxy-4-trifluoroacetylpiperazine.
11. 1-ethyl-4-trifluoroacetyl piperazine.
12. 1-phenyl-4-trichloroacetylpiperazine.
13. 1-propyl-4-trifluoroacetylpiperazine hydrochrloride.

References Cited in the file of this patent

UNITED STATES PATENTS 2,807,617    Dalalian et al. _____ Sept. 24, 1957